C. E. CLARK.
SEED CORN SAMPLING MACHINE.
APPLICATION FILED NOV. 30, 1917.
1,276,328.
Patented Aug. 20, 1918.
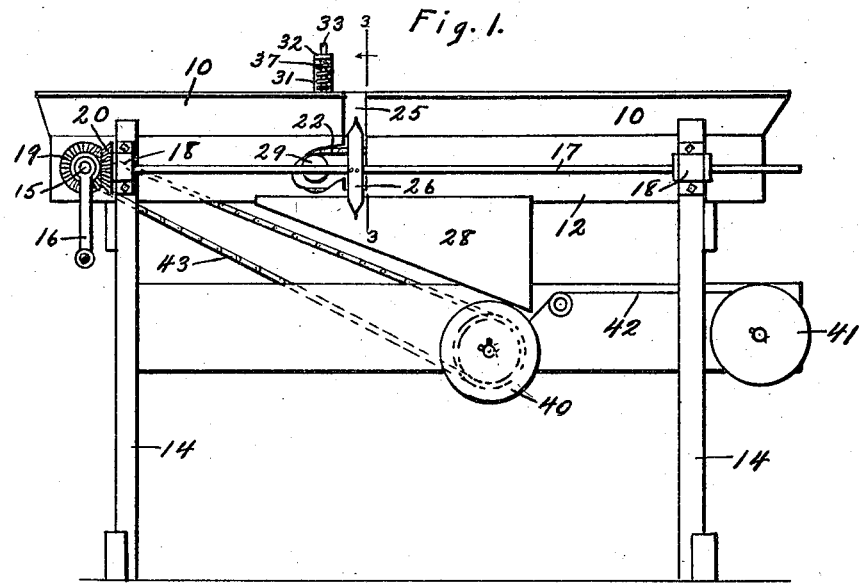
Fig. 1.
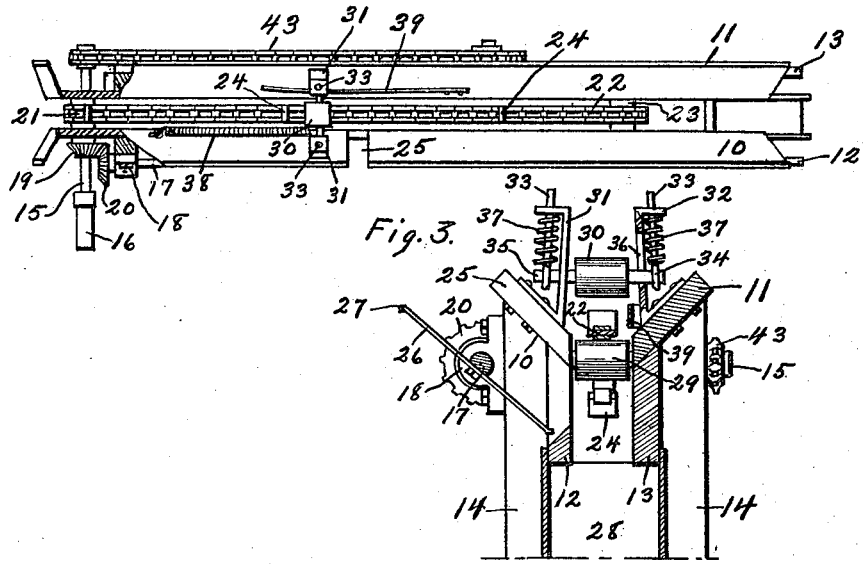
Fig. 2.
Fig. 3.
INVENTOR.
C. E. CLARK
BY Silas C. Sweet
ATTORNEY.

UNITED STATES PATENT OFFICE.

CHARLES EDWARD CLARK, OF HUBBARD, IOWA.

SEED-CORN-SAMPLING MACHINE.

1,276,328.   Specification of Letters Patent.   Patented Aug. 20, 1918.

Application filed November 30, 1917. Serial No. 204,802.

*To all whom it may concern:*

Be it known that I, CHARLES EDWARD CLARK, a citizen of the United States, and resident of Hubbard, Hardin county, Iowa, have invented a new and useful Seed-Corn-Sampling Machine, of which the following is a specification.

The object of this invention is to provide an improved construction for a machine for removing sample kernels from ears of seed corn for the purpose of testing such samples.

A further object of this invention is to provide an improved machine for removing test samples from ears of seed corn and depositing such samples in devices in which they may be germinated and subjected to tests as to vitality.

My invention consists in the construction, arrangement and combination of elements hereinafter set forth, pointed out in my claims and illustrated by the accompanying drawings, in which—

Figure 1 is a side elevation of a machine embodying my invention, a portion being broken away to reveal interior construction. Fig. 2 is a plan of the same, partly in section. Fig. 3 is a vertical section on the line 3—3 of Fig. 1, on an enlarged scale.

In the construction of the machine as shown a trough is formed of inclined side members 10, 11 spaced apart at their lower margins, and parallel vertical members 12, 13 extending downwardly from the lower margins of said inclined members; and the trough so formed is supported at a suitable height by legs 14. An operating shaft 15 extends transversely through and is journaled for rotation in one end portion of the trough and is provided with operating means such as a crank 16 at one end. A countershaft 17 extends longitudinally outside of and parallel with the trough and is journaled for rotation in bearings 18 carried by upper ends of legs 14. A bevel gear 19 on the operating shaft 15 meshes with and is adapted to drive a bevel gear 20 on the adjacent end of the countershaft 17. A sprocket wheel 21 is fixed to the operating shaft 15 within the trough, that is to say between the members 12, 13, and an endless chain 22 engages said sprocket wheel and is adapted for travel within and lengthwise of the trough, the opposite end of said chain being supported by a roller or wheel 23 mounted for rotation in the opposite end portion of the trough. Certain of the links of the chain 22 are formed with upstanding lugs 24 which are equally spaced apart a certain approved distance, and I find a suitable distance in practice to be about fourteen inches. A slot, notch or opening 25 is formed in the side of the trough adjacent the countershaft 17, in the side members 10 and 12 of said trough, and a pick 26 is fixed to said shaft and adapted to pass through said slot, notch or opening when the shaft is rotated, into proximity to the chain 22. The pick 26 preferably is fixed at its central portion to the countershaft and each end thereof is adapted to pass in sequence through the opening 25, the ends of said pick being attenuated and bent backwardly somewhat to form fingers 27 adapted to engage kernels of corn and remove them from the ears.

In practical use ears of seed corn are laid upon the chain 22 and each ear is engaged and carried along on said chain by a lug 24 when the crank 16 is turned. As each ear passes the opening 25 one or more kernels are removed therefrom by the rotating pick 26 by engagement of the fingers 27 and the kernels so removed are caught by a chute 28 fixed to the central portion of the trough and leading downwardly and longitudinally thereof. A roller 29, preferably having a rubber periphery, is journaled for rotation in and transversely of the trough and beneath the upper bight of the chain 22 adjacent the opening 25, and said roller is adapted to provide a yielding support for said chain and for ears of corn thereon. A second roller 30 is journaled in the trough above the roller 29 and the said roller 30 preferably is yieldingly mounted for limited vertical movement. In this instance brackets 31 are fixed to and rise from the inclined trough members 10, 11 and are formed with out-turned apertured ears 32 at their upper ends through which stems 33 are slidingly mounted. The stems 33 are formed with eyes 34 at their lower ends which serve as bearings for end portions of the shaft 35 of the upper roller 30, said shaft extending through vertical slots 36 in the brackets 31. Coil springs 37 are mounted on the stems 33 between the eyes 34 thereof and the ears 32 and yieldingly hold the roller shaft toward the lower end of the slots 36, permitting upward movement of said shaft when the roller 30 is engaged by an ear of corn on the chain 22. Thus yielding means is provided for holding an ear in relatively rigid position while being engaged by the pick 26 for removal of kernels therefrom. I also provide springs extending longitudinally of the inclined trough members 10, 11 and adapted to engage the ears of corn on the chain 22 and prevent or limit lateral movement of such ears under pressure of the pick. In this instance I have shown a coil spring 38 and a leaf spring 39 so employed, but either or both forms may be used as desired.

The test kernels removed from the ears as above described may be delivered by the chute to any suitable devices provided for germinating and testing such kernels. In the accompanying drawing I have shown a form of such device in a general way, which device is illustrated and described in detail in my copending application executed on even date herewith, filed November 30, 1917, Serial Number 204,801. Drums 40, 41 are spaced apart and mounted for rotation below the trough and are adapted to carry a germinator strip 42 which is designed to receive kernels from the chute 28 as it is wound from one to the other of said drums. Sprocket gearing 43 is provided for driving the drum 40 from the operating shaft 15 so that the strip 42 is carried from one to the other of the drums as the mechanism in the trough is operated. For further details of this mechanism I refer to my companion application above mentioned. Means also is provided in connection with the strip 42 for identifying the test kernels relative to the ears from which they are removed so that the result of the test of the kernels may indicate the vitality and desirability of the respective ears as seed.

The ears of corn may be placed manually on the chain 22 at the initial end of the trough and removed manually therefrom at the other end after test or sample kernels have been picked out as described, and then placed in any suitable location to await the result of the test.

I claim as my invention—

1. A seed-corn sampling machine, comprising a trough, a chain mounted for travel therein and adapted to receive and carry ears of corn, and a picking device mounted for movement on said trough adjacent said chain and adapted to remove sample kernels from ears on said chain.

2. A seed-corn sampling machine, comprising a trough, a chain mounted for travel therein and adapted to receive and carry ears of corn, a picking device mounted for movement on said trough and adapted to engage ears of corn on said chain and remove kernels therefrom, and means for receiving the kernels so removed.

3. A seed-corn sampling machine, comprising a trough, a member mounted for longitudinal travel in said trough and adapted to receive and carry ears of corn, a pick mounted for movement on said trough and adapted to engage ears on said traveling member and remove test kernels therefrom, a germinator strip, and means for depositing said test kernels so removed on said germinator strip.

4. A seed-corn sampling machine, comprising a trough, a shaft mounted for rotation therein, a chain mounted for longitudinal travel in said trough and adapted to be driven by said shaft, a pick mounted for rotation across said trough and into juxtaposition to said chain, and means connected with said shaft for operating said pick.

5. A seed-corn sampling machine, comprising a trough, a shaft mounted for rotation therein, an endless member mounted for travel lengthwise of said trough and for operation by said shaft, a pick adapted for operation by said shaft and adapted for movement toward said endless device, and a chute leading from said trough adjacent said pick.

6. A seed-corn samping machine, comprising a trough, an endless device mounted for travel therein, said endless device being adapted to receive and carry ears of corn, a pick mounted for movement adjacent said endless device and adapted to remove test kernels from ears of corn on said chain, means for simultaneously operating said endless device and pick, and yielding pressure devices adapted to engage and hold ears of corn on said endless device for operation of said pick.

7. A seed-corn sampling machine, comprising a trough, an endless device mounted for travel therein and adapted to receive and carry ears of corn, a pick mounted on said trough and adapted to engage ears on said endless device and remove test kernels therefrom, means for simultaneously operating said endless device and pick, yielding devices to limit upward movement of ears of corn when engaged by said pick and yielding devices to limit lateral movement of said ears under such engagement.

8. A seed-corn sampling machine, comprising a trough, an endless device mounted for travel therein and adapted to receive and carry ears of corn, a pick mounted on said trough and adapted to engage ears of corn on said endless device and remove test kernels therefrom, means for simultaneously operating said endless device and pick, a roller journaled in said trough beneath said endless device, and a roller journaled above the first roller and also adapted for vertical movement, yielding pressure devices being provided for controlling such vertical movement.

CHARLES EDWARD CLARK.

Copies of this patent may be obtained for five cents each, by addressing the "Commissioner of Patents, Washington, D. C."